United States Patent [19]
Matsuura et al.

[11] Patent Number: 6,017,126
[45] Date of Patent: Jan. 25, 2000

[54] ROTATABLE DOOR MIRROR

[75] Inventors: Akira Matsuura; Masayuki Nomura, both of Toyota; Masato Sakamoto, Aichi-ken, all of Japan

[73] Assignees: Toyota Jidosha Kabushiki Kaisha, Toyota; Kabushiki Kaisha Tokai-Rika-Denki-Seisakusho, Niwa-gun, both of Japan

[21] Appl. No.: 09/299,561

[22] Filed: Apr. 27, 1999

[30] Foreign Application Priority Data

Apr. 27, 1998 [JP] Japan .................................. 10-117429

[51] Int. Cl.$^7$ ..................................................... G02B 7/182
[52] U.S. Cl. .......................... 359/872; 359/874; 359/875; 359/877; 359/841
[58] Field of Search ..................................... 359/872, 874, 359/875, 876, 877, 841; 248/474, 473, 485

[56] References Cited

U.S. PATENT DOCUMENTS 5,432,640  7/1995  Gilbert et al. ........................... 359/841

FOREIGN PATENT DOCUMENTS 61-081441  5/1986  Japan .
7-069134   3/1995  Japan .

*Primary Examiner*—Cassandra Spyrou
*Assistant Examiner*—Mohammad T. Sikder
*Attorney, Agent, or Firm*—Pillsbury Madison & Sutro LLP

[57] ABSTRACT

Since a notch 30 is formed in a circular arc form at a distal end upper corner portion of a protruding portion 16A, from a rear end portion of the protruding portion 16A towards a front end side, even when a mirror 28 swings, a vehicularly transversely inward end portion 28A of the mirror 28 does not interfere with the distal end upper corner portion of the protruding portion 16A. Further, a front wall portion 16C of the protruding portion 16A is left at a front end portion of the notch 30. A front end portion 14A of a mirror body 14, the front end portion 14A facing the front wall portion 16C, is separated a predetermined amount from a side wall portion 30A of the notch 30 in an outward direction of a rotational radius. Accordingly, when the stay 16 is rotated a predetermined angle θ towards a front side of a vehicle body, a space S remains between the front end portion 14A of the mirror body 14 and the stay 16, and the front end portion 14A of the mirror body 14 does not interfere with the stay 16. As a result, since it is possible to bring the mirror 28 towards a side that is tranversely inward with respect to the vehicle, it is possible to dispose the mirror body 14 containing the mirror 28 towards the side that is transversely inward with respect to the vehicle.

2 Claims, 6 Drawing Sheets

FIG. 4
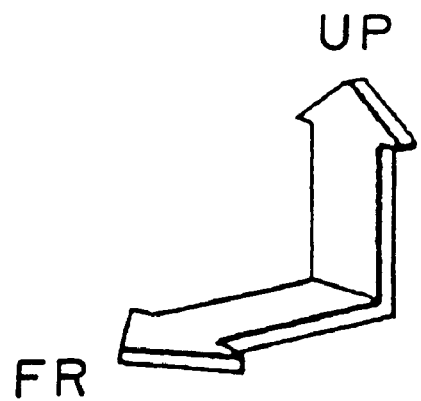
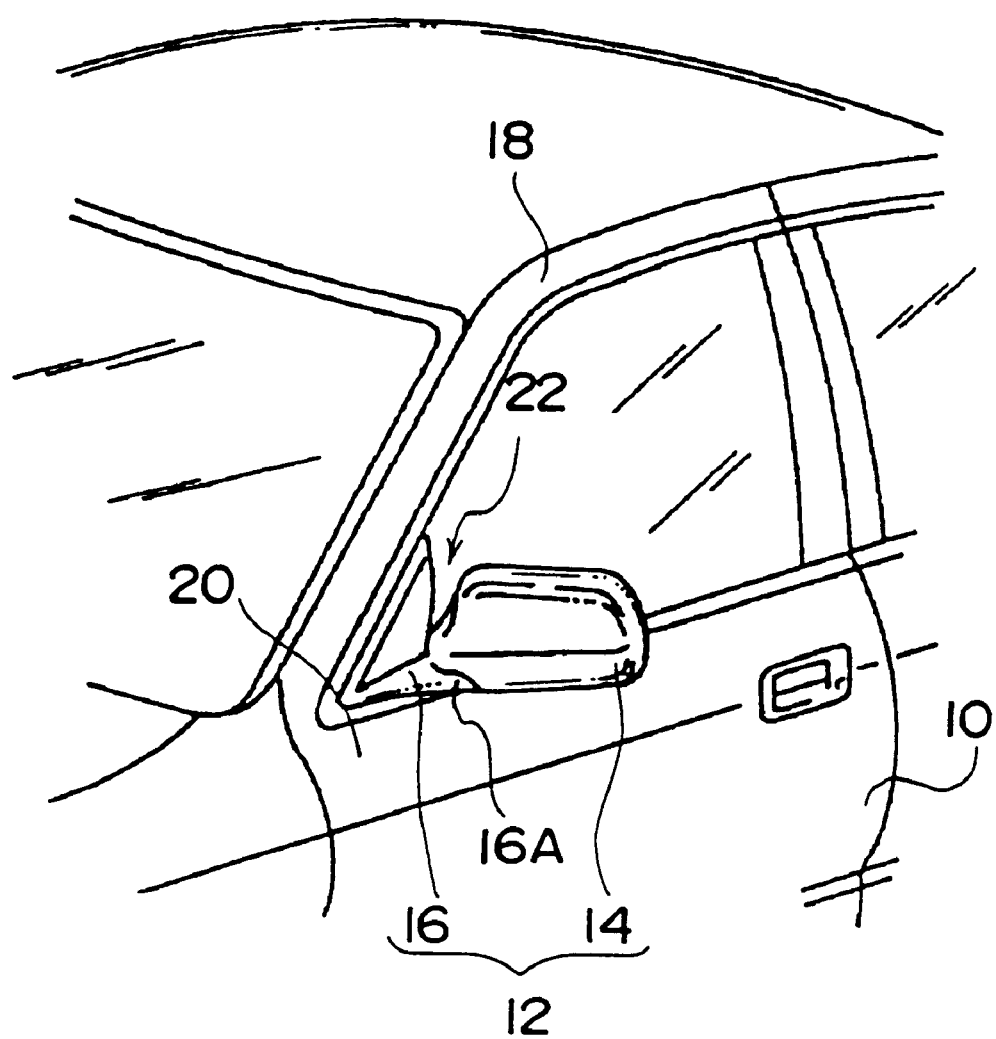

ROTATABLE DOOR MIRROR

BACKGROUND OF THE INVENTION

1. Field of the Invention

The present invention relates to a rotatable door mirror, and more particularly relates to a rotatable door mirror to be disposed at a triangular corner portion of a side door of an automobile.

2. Description of the Related Art

Conventionally, as rotatable door mirrors to be attached to a side door of an automobile, mirrors having structures such as that illustrated in FIG. 5, for example, are known.

A stay 74 (also called a base plate) for attaching a mirror body 72 to a vehicle body is attached to this door mirror 70 at a triangular corner portion formed by a door window frame and a door panel. Further, a shaft 76 is provided in an upright position at a stay 74A of the stay 74. This shaft 76 is inserted into a socket 78 provided at a frame (not illustrated) of a mirror body 72. The mirror body 72 is able to swing in a forward and rearward direction with respect to a vehicle body, and is structured so as to rotate towards a front side when a load is applied from a rear side.

Further, in this door mirror 70, in order to widen the visual field allowed by a mirror 80, a height H, which extends in an upward and downward direction of a mirror 80 disposed inside the mirror body 72, is increased. Further, a lower end portion 80A of the mirror 80 extends to a position that is lower than a horizontally extending surface P of an upper surface 74B of the stay 74A.

However, in a vehicle in which the door mirror 70 of the kind described above is used, it is necessary to bring the mirror body 72 towards a side that is inward in a transverse direction of the vehicle in order to decrease the width of the vehicle body without decreasing a width W of the mirror 80, the width extending in a transverse direction of the vehicle. Namely, so that an end portion 80B of the mirror 80, the end portion being at a side in the transversely inward direction of the vehicle and swinging within a mirror angle adjusting range indicated by a triple-dashed chain line in FIG. 6, does not interfere with a distal end portion 74C of the stay 74A, it is necessary to form a space S1. In addition, it is necessary to form a space S2 so that the mirror body 72 does not interfere with the stay 74A at a position wherein the mirror body 72 is rotated a predetermined angle θ towards the front side of the vehicle body. As a result, it is difficult to bring the mirror 80 in the transversely inward direction of the vehicle sufficiently.

SUMMARY OF THE INVENTION

In view of the aforementioned, an object of the present invention is to provide a door mirror wherein a mirror body can be disposed towards a side in a transversely inward direction of the vehicle and to eliminate interference between a mirror and a stay, and between the mirror body and the stay.

An aspect of the present invention is a rotatable door mirror in which a shaft is erected in an upper surface of a protruding portion of a stay, a mirror body is attached to the stay so as to be swingable with an axis of the shaft as a center, and a lower portion of a mirror disposed in the mirror body extends to a lower side of an extending surface of the upper surface of the protruding portion, the rotatable door mirror comprising: a notch formed at a distal end upper corner portion of the stay from a rear end portion of the stay towards a front side; and a front wall portion of the stay, left at a front end portion of the notch.

Since the notch is formed at the distal end upper corner portion of the stay from the rear end portion of the stay towards the front side, even when the mirror swings, the end portion of the mirror at the side in the transversely inward direction of the vehicle does not interfere with the distal end upper corner portion of the stay. The notch may be formed in a circular arc form from the rear end portion of the protruding portion towards the front side. Further, the front wall portion of the stay remains at the front end portion of the notch and the front end portion of the mirror body that faces the front wall portion is spaced a predetermined amount from the front wall portion of the stay in an outward direction of a rotational radius. As a result, when the mirror body is rotated towards the front side with respect to a vehicle body, a space is left between the stay and the front end portion of the mirror body, and the stay and the front end portion of the mirror body do not interfere with each other. A notch-facing surface of the front wall portion of the stay may be formed perpendicularly. As a result, interference between the mirror and the stay and between the mirror body and the stay is eliminated, and it is possible to dispose the mirror body towards a side in the transversely inward direction of the vehicle.

BRIEF DESCRIPTION OF THE DRAWINGS

FIG. 4 is a perspective view illustrating a portion of the vehicle in which the rotatable door mirror according to the embodiment of the present invention is provided, as seen from a front side of the vehicle exterior.

DESCRIPTION OF THE PREFERRED EMBODIMENT

Figure 1:
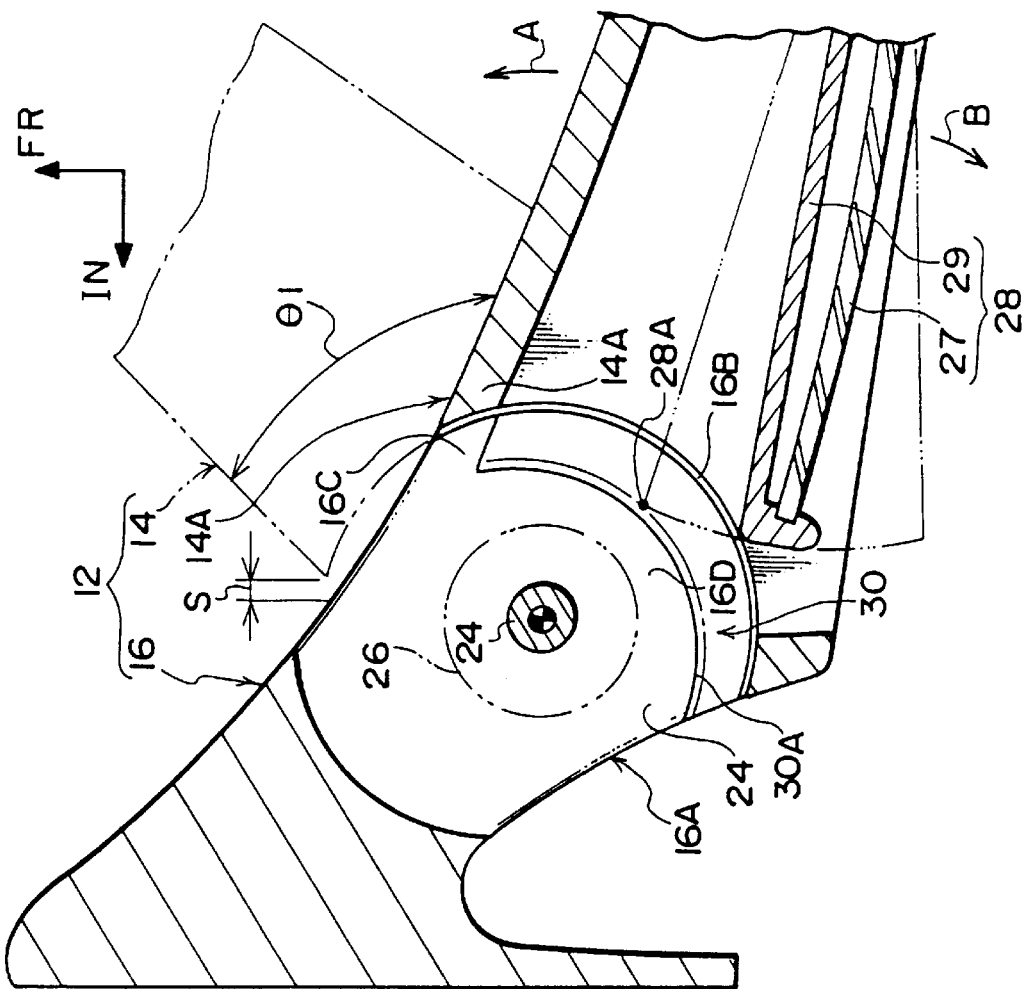
FIG. 1 is an enlarged cross-sectional view, wherein the cross-section is taken along a line 1—1 in FIG. 3.

An embodiment of a rotatable door mirror of the present invention will be explained while referring to FIGS. 1 to 4.

Further, in the figures, an arrow FR indicates a forward direction of a vehicle body, an arrow IN indicates a transversely inward direction of a vehicle, and an arrow UP indicates an upward direction of the vehicle body.

As illustrated in FIG. 4, a door mirror 12 provided at a front side door 10 of an automobile is formed with a mirror body 14 and a stay 16. The stay 16 has a triangular form when seen from a side view, and is attached to a triangular corner portion 22 formed with a door window frame 18 and a door panel 20. Further, a protruding portion 16A protrudes from a lower portion of the stay 16 in a substantially horizontal direction with respect to the vehicle body.

As shown in FIG. 1, the protruding portion 16A protrudes from the stay 16 in a diagonally rearward direction with respect to the vehicle body. A distal end portion 16B is formed in a circular arc form. Further, a shaft 24 is provided upright in the protruding portion 16A. This shaft 24 is inserted into a socket 26 provided at a frame (not illustrated) of the mirror body 14. The mirror body 14 is swingable in a forward and rearward direction with respect to the vehicle body (the directions indicated by an arrow A and an arrow B in FIG. 1, respectively). When a load is applied from the rearward direction, the mirror body 14 can be rotated in the forward direction, as indicated by the double-dashed chain line in FIG. 1. Further, a mirror 28 disposed inside an aperture portion of the mirror body 14 is formed with a mirror body 27 and a mirror holder 29.

Figure 3:
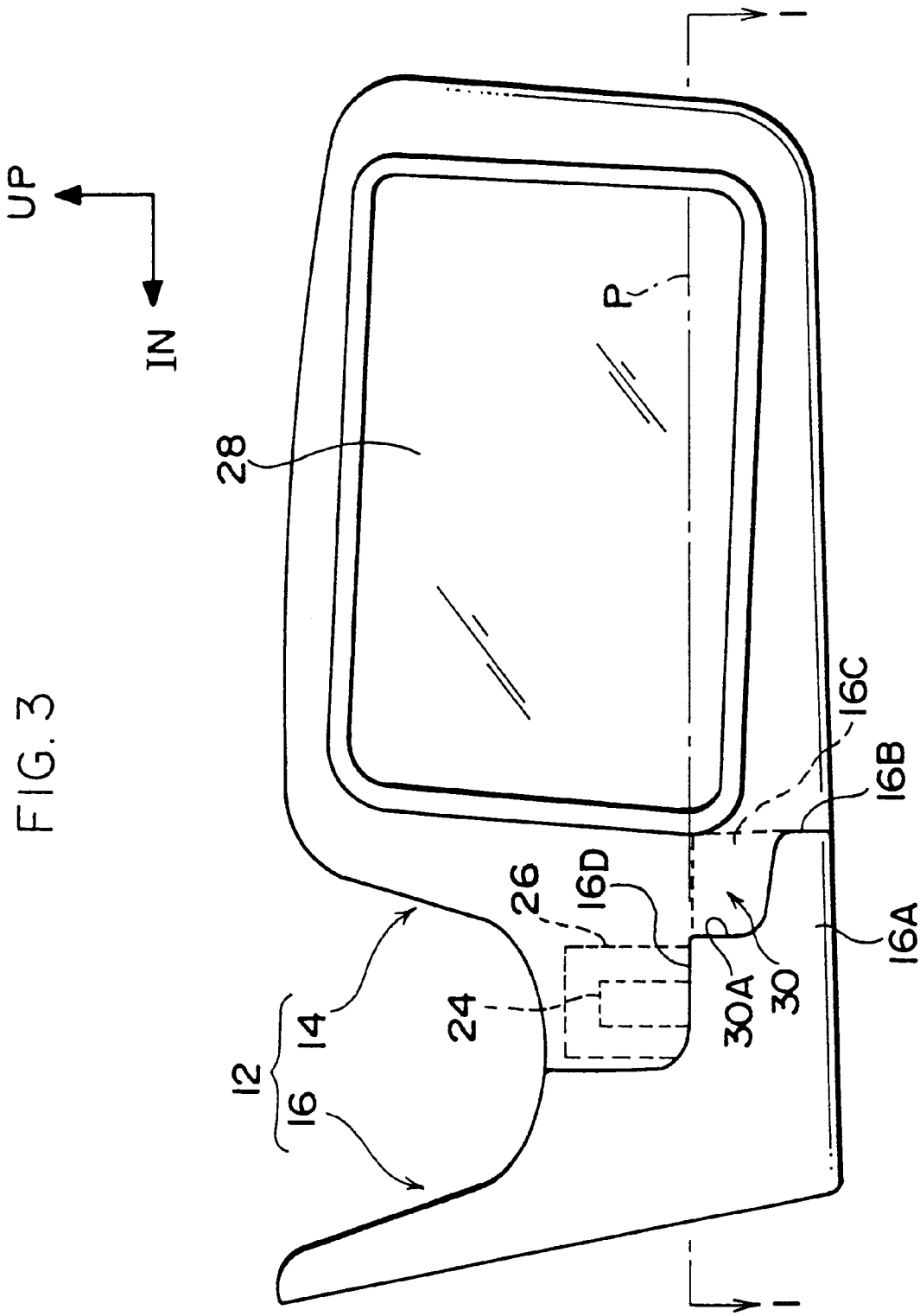
FIG. 3 is a plan view of the rotatable door mirror according to the embodiment of the present invention, as seen from the rear side of the vehicle.
Figure 5:
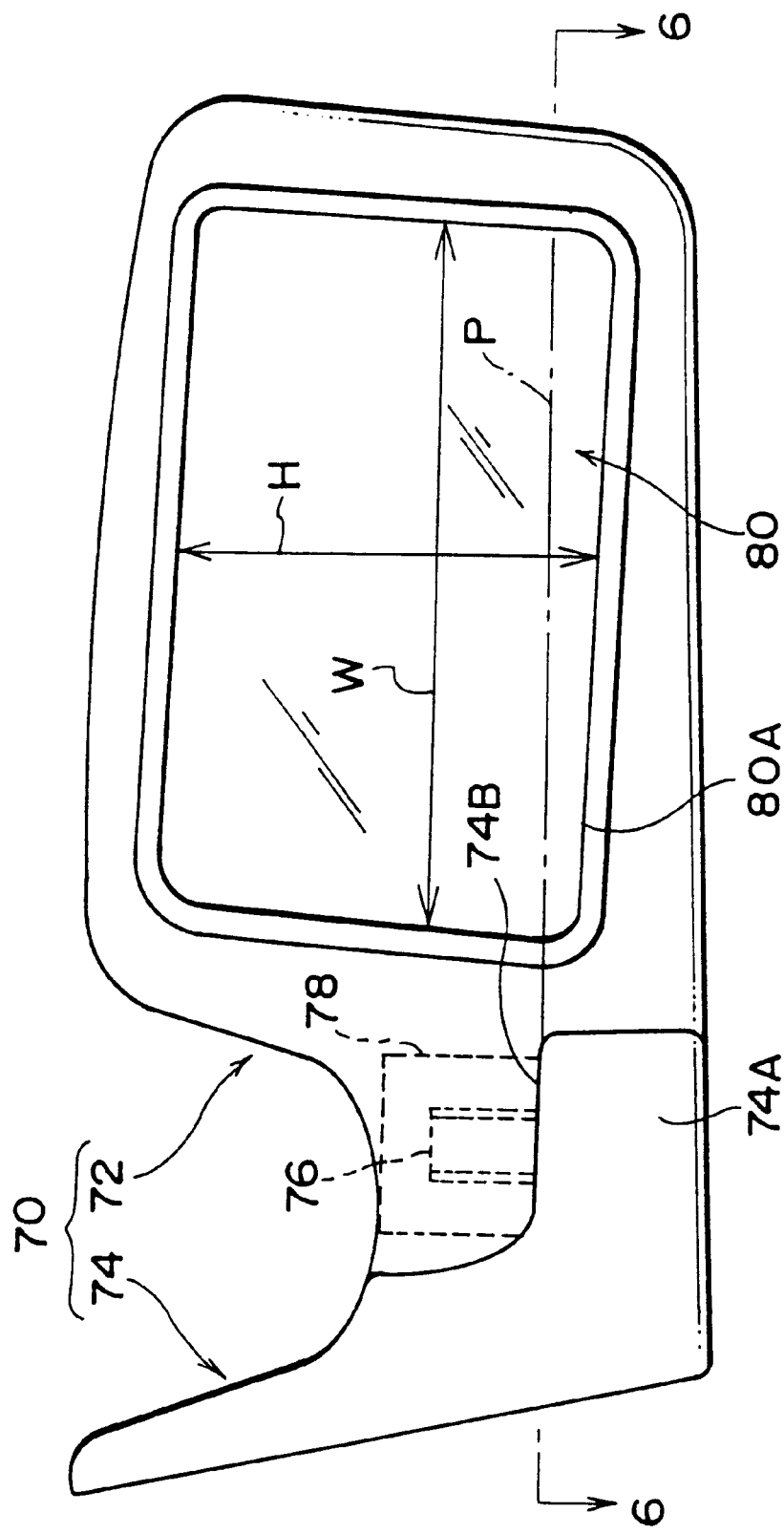
FIG. 5 is a plan view illustrating a rotatable door mirror according to a conventional embodiment, as seen from the rear side of the vehicle.
Figure 6:
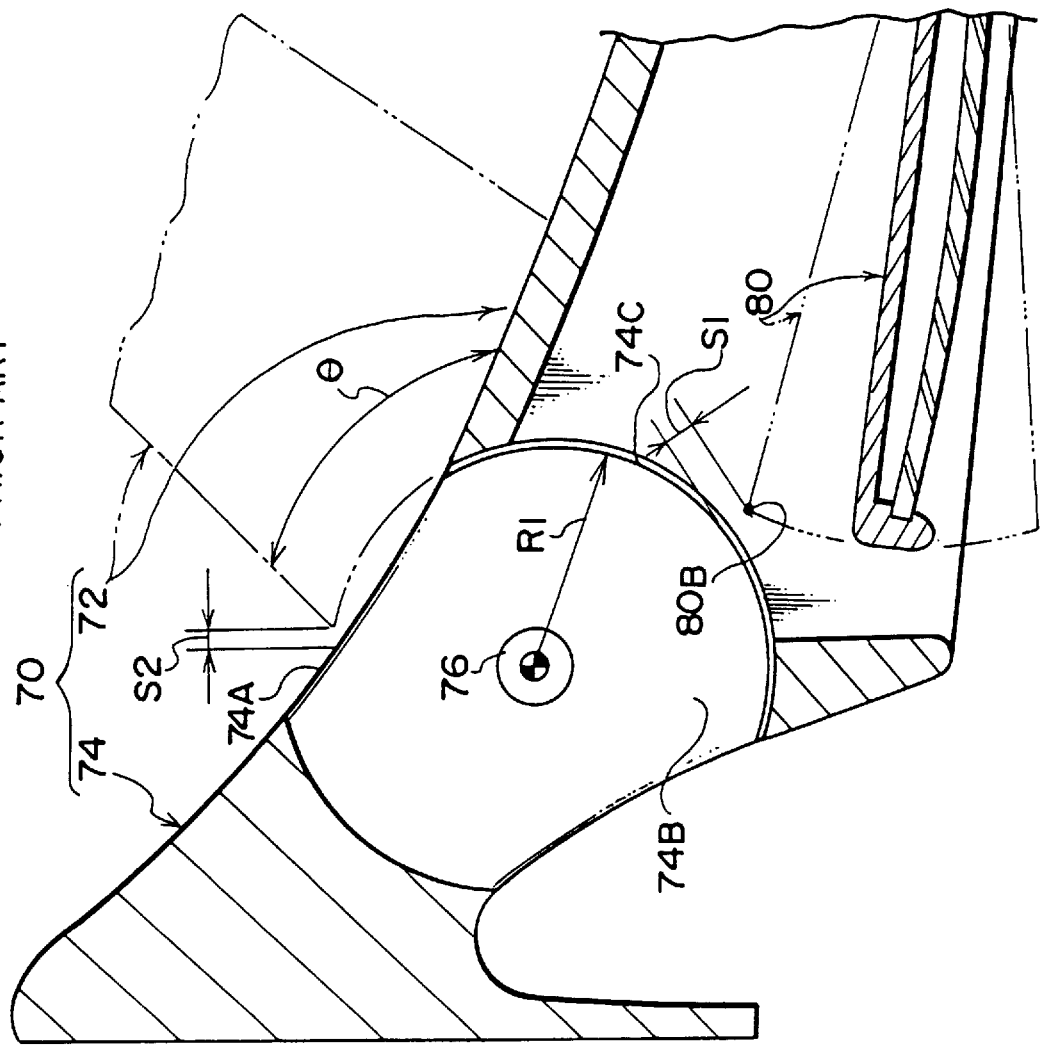
FIG. 6 is an enlarged cross-sectional view of the rotatable door mirror according to the conventional embodiment, wherein the cross-section is taken along a line 6—6 in FIG. 5.

The mirror 28 has as a center an intermediate portion in the transverse direction of the vehicle, and can swing in a forward and rearward direction of the vehicle body within a mirror angle adjusting range indicated by a triple-dashed chain line in FIG. 1. Further, as illustrated in FIG. 3, a lower portion of the mirror 28 of the door mirror 12 extends to a lower side of an extending surface P of an upper surface 16D of the protruding portion 16A.

Figure 2:
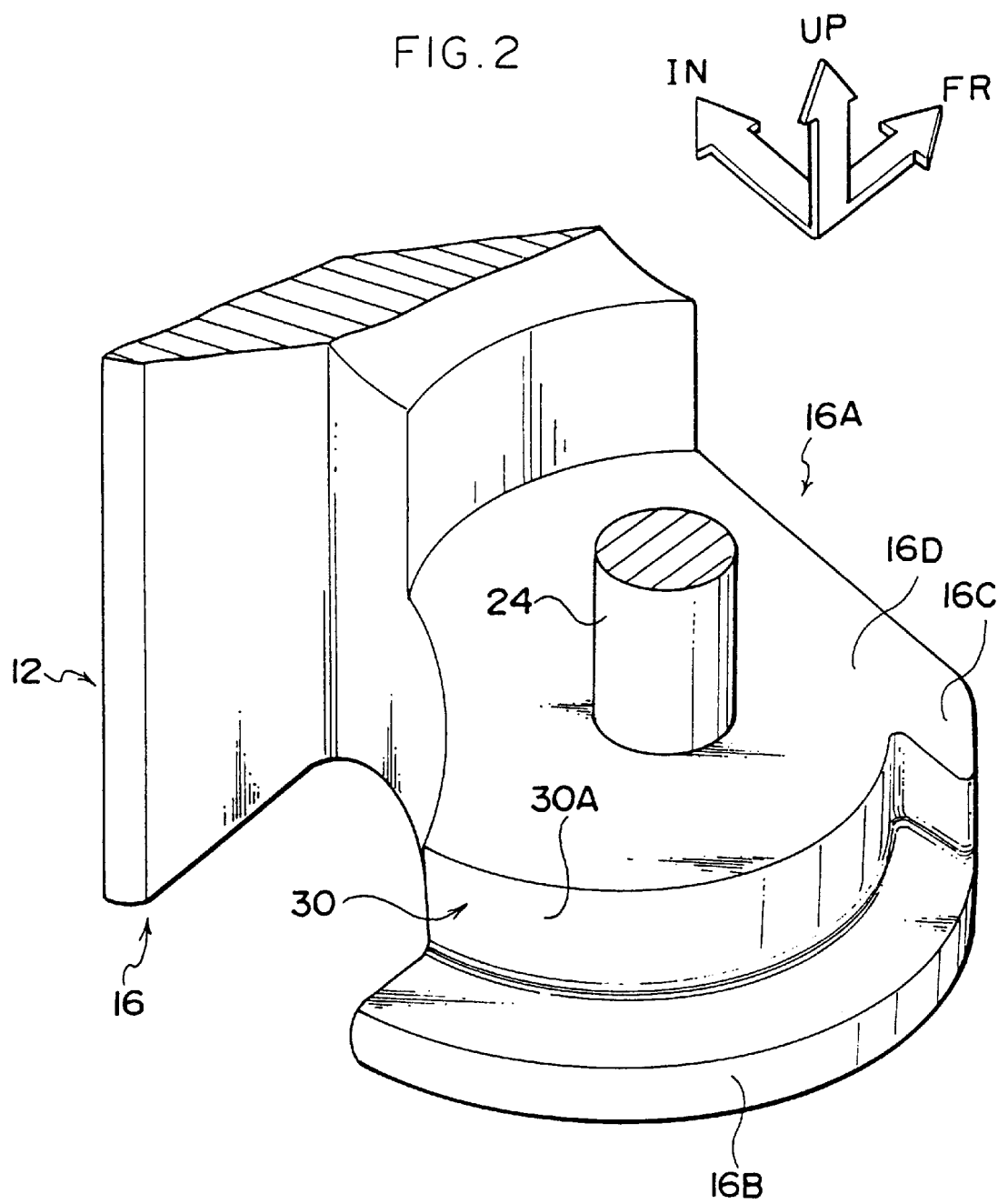
FIG. 2 is a perspective view of a portion of a stay of a rotatable door mirror according to the embodiment of the present invention, as seen from a rear side of a vehicle exterior.

As illustrated in FIG. 2, in the present embodiment, a notch 30 is formed at a distal end upper corner portion of the protruding portion 16A. This notch 30 is of a circular arc form extending from a rear end portion of the protruding portion 16A towards a front side. As a result, when the mirror 28 swings within the mirror angle adjusting range indicated by the triple-dashed chain line in FIG. 1, the mirror 28 does not interfere with the distal end upper portion of the protruding portion 16A. As indicated by a double-dashed chain line in FIG. 1, when the mirror body 14 swings in the forward or rearward direction, a path of movement of a vehicularly transversely inward portion 28A of the mirror 28 is a circular arc having the shaft 24 as a center, and in this case as well, the mirror 28 does not interfere with the distal end upper corner portion of the protruding portion 16A.

Further, a front wall portion 16C of the protruding portion 16A is left at a front end portion of the notch 30. A front end portion 14A of the mirror body 14, which faces the front wall portion 16C, is separated a predetermined distance in a direction in an outward direction of the rotational radius, from a side wall portion 30A of the notch 30. As a result, as illustrated by the double-dashed chain line in FIG. 1, when the stay 16 is rotated a predetermined angle θ towards a front side with respect to the vehicle body, a space S remains between the front end portion 14A of the mirror body 14 and the stay 16, and the front end portion 14A of the mirror body 14 does not interfere with the stay 16.

As a result, since it is possible to bring the mirror 28 towards a side in the transversely inward direction of the vehicle, it is possible to dispose the mirror body 14 containing the mirror 28 towards the side in the transversely inward direction of the vehicle.

Further, when viewing the door mirror 12 from a front side of the vehicle under conditions of ordinary usage, the quality of the outside appearance does not deteriorate since a space between the front wall portion 16C of the protruding portion 16A and the front end portion 14A of the mirror body 14 is slight.

Above, a detailed explanation was provided of a specific embodiment of the present invention. However, the present invention is not limited to this embodiment, and it is clear to those skilled in the art that various other embodiments are possible within the scope of the present invention.

In accordance with the present invention, the following excellent effect is obtained. In the rotatable door mirror wherein the shaft is erected in the upper surface of the protruding portion of the stay, the mirror body is attached to the stay so as to be swingable with the axis of the shaft as the center, and the lower portion of the mirror disposed in the mirror body extends to the lower side of the extending surface of the upper surface of the protruding portion, since the notch, which is formed at the distal end upper corner portion of the stay from the rear end portion of the stay towards the front side, and the front wall portion of the stay, which is left at the front end portion of the notch, is included, interference between the mirror and the stay and between the mirror body and the stay is eliminated, and it is possible to dispose the mirror body towards the side in the transversely inward direction of the vehicle.

What is claimed is:

1. A rotatable door mirror in which a shaft is erected in an upper surface of a protruding of a stay, a mirror body is attached to the stay so as to be swingable with an axis of the shaft as a center, and a lower portion of a mirror disposed in the mirror body extends to a lower side of an extending surface of the protruding portion, the rotatable door mirror comprising:

a notch formed at a distal end upper corner portion of the stay from a rear end portion of the stay towards a front side; and a front wall portion of the stay, left at a front end portion of the notch;

wherein the notch is formed from a rear end portion of the protruding portion towards the front side, in a circular arc form.

2. A rotatable door mirror according to claim 1, wherein a notch-facing surface of the front wall portion of the stay is perpendicularly formed.

* * * * *